Figure 3:
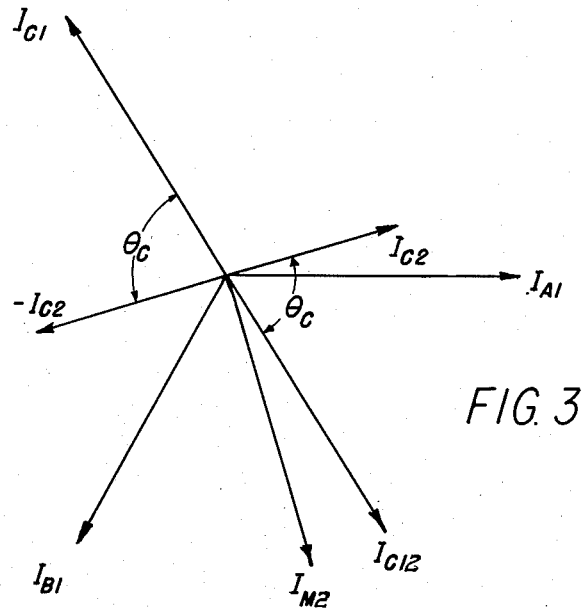

Dec. 27, 1960 W. C. DOWNING, JR., ET AL 2,966,629
MEASURING STRUCTURE
Filed May 8, 1957 3 Sheets-Sheet 1
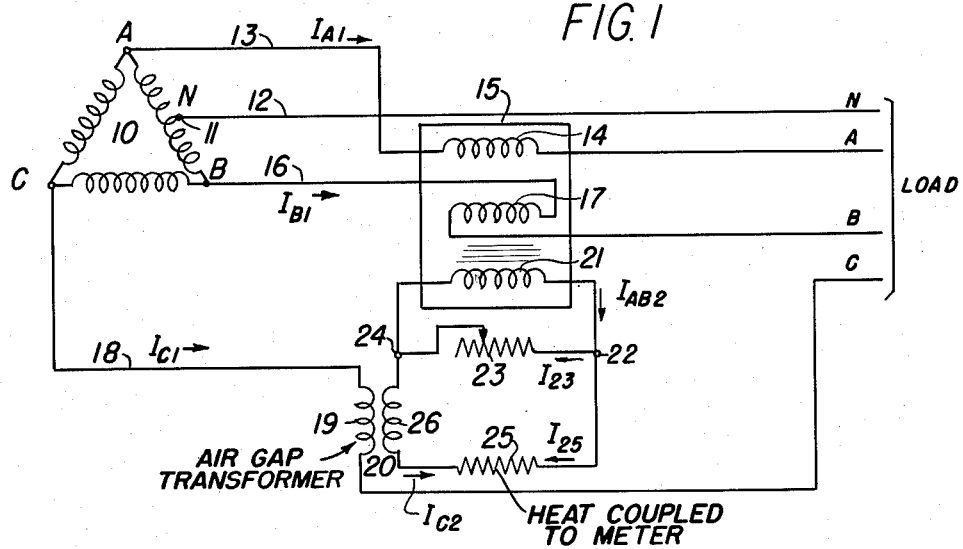
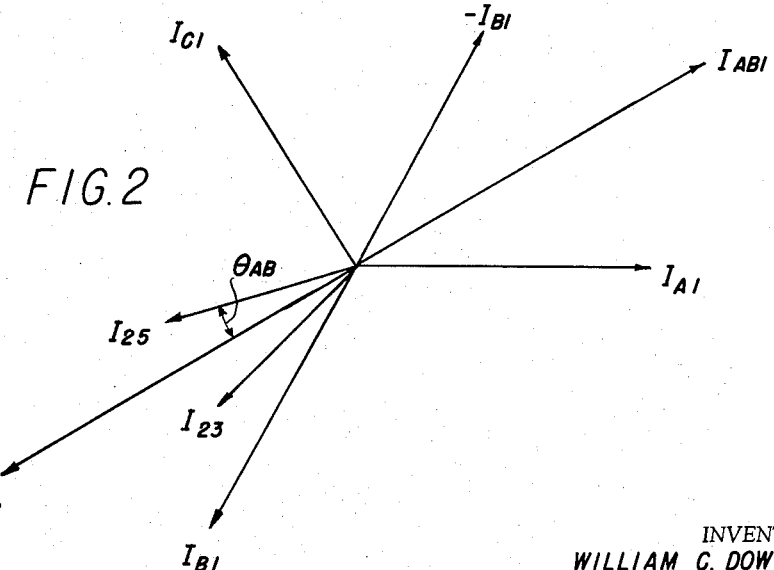
INVENTORS,
WILLIAM C. DOWNING, JR.
DAN McAULIFF
BY Brown, Jackson,
Boettcher & Dienner
ATTYS INVENTORS.
WILLIAM C. DOWNING, JR.
DAN MC AULIFF
BY Brown, Jackson,
Boettcher + Diemer
ATTYS., Dec. 27, 1960   W. C. DOWNING, JR., ET AL   2,966,629
MEASURING STRUCTURE
Filed May 8, 1957   3 Sheets-Sheet 3

PHASE SEQUENCE A-B-C

INVENTORS.
WILLIAM C. DOWNING, JR.
DAN MC AULIFF
BY Brown, Jackson,
Boettcher & Dienner
ATTYS.

United States Patent Office 2,966,629
Patented Dec. 27, 1960

2,966,629

MEASURING STRUCTURE

William C. Downing, Jr., and Dan McAuliff, Springfield, Ill., assignors, by mesne assignments, to Sangamo Electric Co., Springfield, Ill., a corporation of Delaware Filed May 8, 1957, Ser. No. 657,888

5 Claims. (Cl. 324—107)

This invention is directed to measuring structures and more particularly to such structures for indicating electrical quantities.

The use of electrical power in this country, both in industry and by individual consumers, has increased gradually and steadily over the years and today it is utilized virtually everywhere. This wide use has created a need for accurate and simple instruments to measure, for example, apparent power supplied as volt-ampere demand.

Such metering is relatively uncomplicated in a single phase electrical system. In such a system the volt-amperes, and thus the apparent power, are substantially proportional to the current flowing in the system. Therefore, a single current responsive element, such as a resistive element which emits heat in proportion to the square of the amount of current which flows through the element, can be connected so that the load current flows through such element, thereby indicating the apparent power supplied to the consumer. However, in a system such as a three phase, four wire delta-connected system, there are three separate currents flowing, each displaced in phase by 120 degrees from the other two currents, under balanced load conditions, and the current in the fourth (neutral) wire is zero. It may be attempted to provide a demand indication of such polyphase circuits by the insertion of a single meter in each of the three phases, but this method will not necessarily measure the demand as indicated by the invention nor will such method even be equivalent to the instantaneous values existing in the circuit.

In commercial polyphase power installations today, the voltages are maintained substantially at a predetermined magnitude and phase relationship to each other. Thus in such a system with balanced voltages, if some quantity properly related to the currents flowing in each of the three phases can be derived, an indication of the total apparent power supplied to a load on the system can be obtained.

It is an object of this invention to provide improved phase shifting means for shifting the phase of one or more metering currents resulting from currents in one or more of the lines connecting a load to a polyphase system.

It is a further object of the invention to provide means for obtaining metering currents of such magnitude and phase relationship with respect to each other that they can be coupled through a single current responsive element to provide an indication of the total apparent power supplied to a load on a three phase, four wire delta-connected system, or on an ungrounded three phase, three wire delta-connected system.

In accordance with the invention, transformation means is utilized to derive a metering current from two phases in the system. A transformation and phase shifting means is utilized to obtain and shift the phase of a metering current from the current flowing in the third phase of the system. Means are provided to couple such metering currents through a common current responsive element, and thereby provide an indication of the apparent power supplied to the load by the polyphase system.

Figure 4:
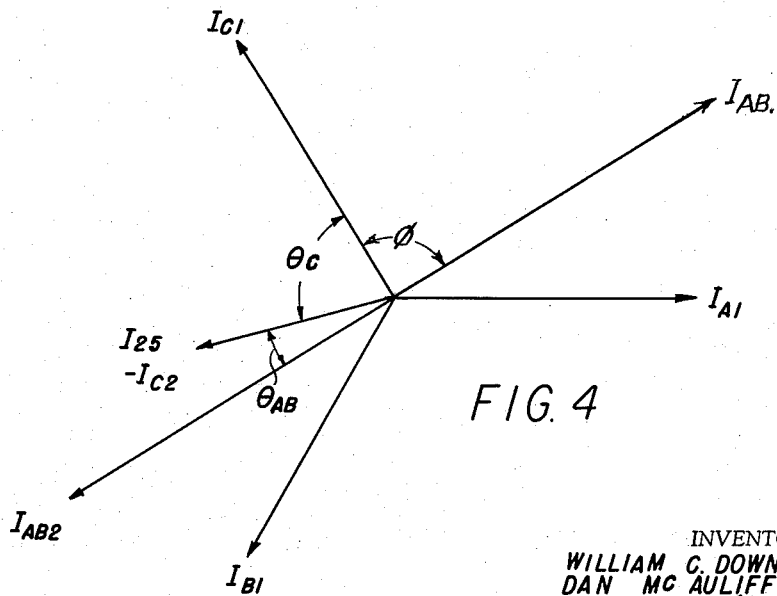
Figure 5:
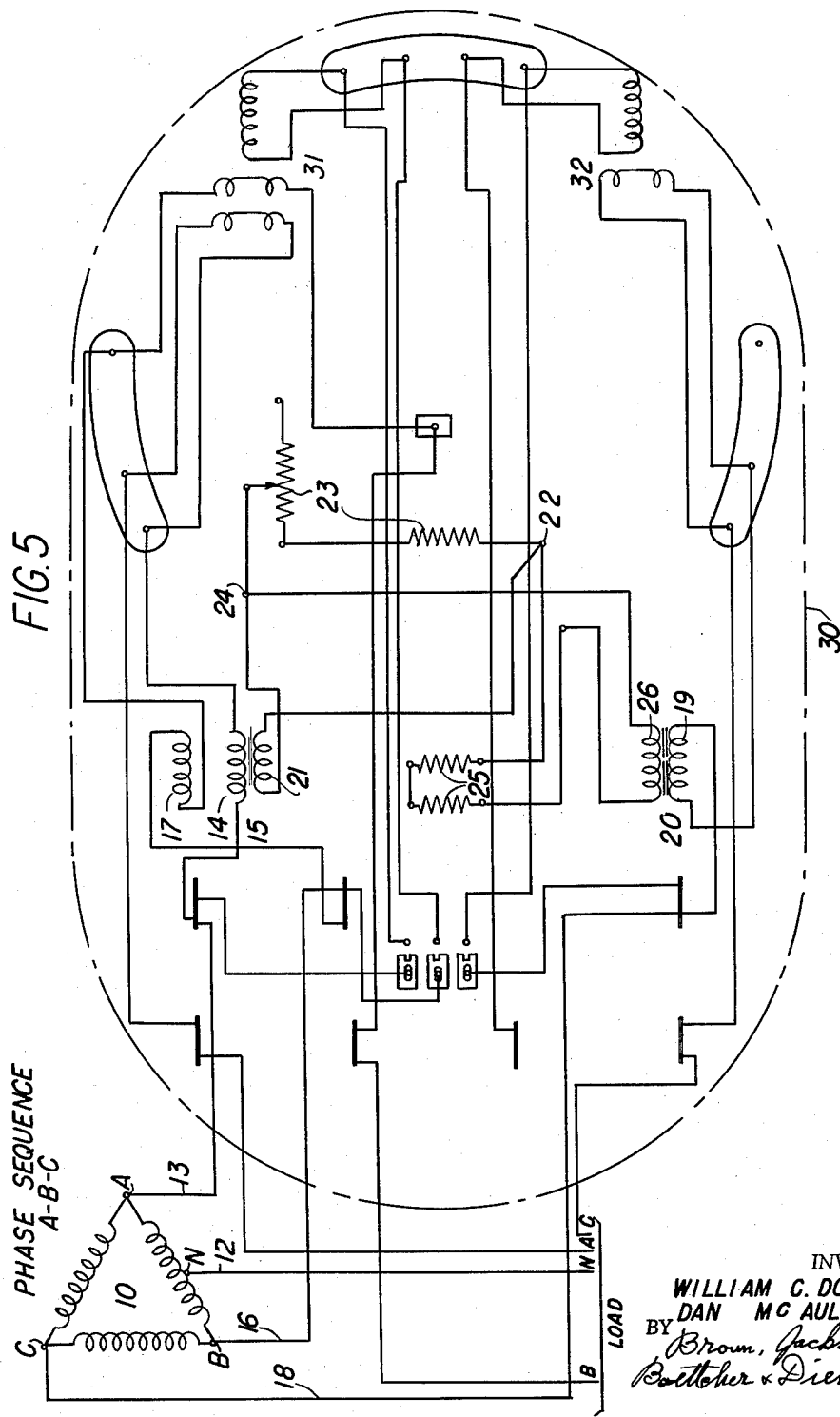

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1 is a schematic diagram of an embodiment of the invention;

Figures 2, 3, and 4 are vector diagrams useful in understanding the operation of the invention;

Figure 5 is a schematic diagram illustrating in greater detail the embodiment shown in Figure 1.

In Figure 1, electrical power is coupled over a conventional distribution system (not shown) to the secondary winding 10 of a three phase, delta-connected power transformer. The neutral connection is made to terminal 11, which connection is coupled over conductor 12 to the load (not shown). The current flowing from terminal A is designated $I_{A1}$, and is coupled over conductor 13, through one primary winding 14 of a three-wire current transformer 15, to the load. The current flowing from terminal B is designated $I_{B1}$, and is coupled over conductor 16, through a reverse primary winding 17 of three-wire current transformer 15, to the load. The transformer 15 also comprises a secondary winding 21 which is responsive to the two primary windings 14 and 17, as will be later described. The current flowing from terminal C is designated $I_{C1}$; this current is coupled over conductor 18, through the primary winding 19 of a two-wire current transformer 20, to the load (not shown).

Figure 2 (not drawn to scale) illustrates in vector form the relationship of the load currents and metering currents flowing in the system under the condition of balanced polyphase load currents. In the vector diagram, the phase sequence is A—B—C, the positive reference being taken as counterclockwise rotation of the vectors. The currents flowing from terminals A, B, and C of secondary winding 10 are represented by the vectors $I_{A1}$, $I_{B1}$, and $I_{C1}$, respectively. Because current $I_{B1}$ flows through the reverse primary winding 17 of three-wire current transformer 15, the effect of such current is represented by a vector $-I_{B1}$, shown in Figure 2 as equal in magnitude but opposite in direction to the current flowing from terminal B of transformer 10. The currents flowing through primary windings 14 and 17 of the transformer 15 may be represented by a single composite current vector $I_{AB1}$. The three-wire current transformer 15 is effective to produce a secondary current $I_{AB2}$ which lags by 180° the composite primary current $I_{AB1}$. Thus it is evident that transformer 15 produces no phase shift between primary and secondary currents, other than the conventional 180° shift attendant upon power transfer from primary to secondary winding. The exciting current in transformer 15 can be minimized, and thus the phase shift maintained at substantially 180° across the transformer, by utilizing suitable core material in the transformer, as is well known and understood in the art.

Secondary current $I_{AB2}$ flows as indicated by the arrow in Figure 1, and divides at reference terminal 22; a portion of the current, designated $I_{23}$, flows through variable resistor 23, to terminal 24, and back to secondary winding 21. The remainder of current $I_{AB2}$, designated $I_{25}$, flows through fixed resistor 25, through the secondary winding 26 of transformer 20, through terminal 24, to the secondary winding 21 of transformer 15. The fixed resistor 25 is a current sensitive element, constructed and arranged to emit heat in proportion to the square of the current flowing therethrough. Accordingly, heating resistor 25 may be coupled to a conventional metering apparatus which utilizes such a heat source to give a visual indication of the current passing therethrough, as is well known and understood in the art.

Because the impedance, comprising resistor 25 and secondary winding 26 of transformer 20, presented to current $I_{25}$ is inductive, current $I_{25}$ lags the current $I_{AB2}$ by a certain angle, which is designated $\Theta_{AB}$ for convenience, as illustrated in Fig. 2.

The current $I_{C1}$, which flows through the primary winding 19 of transformer 20, causes a current to flow in the secondary winding 26 of this transformer. Primary winding 19 and secondary winding 26 are placed as close together as possible to minimize leakage reactance. Figure 3 shows in vector form the effective magnetizing current $I_{M2}$ which is relatively large because of the air gap in the core of transformer 20. The current $I_{C2}$ flowing in the secondary winding 26, due to the load current $I_{C1}$ flowing in the primary winding 19, is the vector difference of $I_{C12}$ (primary current referred to the secondary), and $I_{M2}$, which represents the magnetizing current. Since the magnetizing current $I_{M2}$ is relatively large, the secondary current $I_{C2}$ leads the primary current referred to the secondary $I_{C12}$ by a relatively large angle.

From Fig. 2 it is apparent that, under balanced polyphase load conditions, $I_{AB2}$ leads $I_{C1}$ by 90°, and that $I_{25}$ lags $I_{AB2}$ by an angle $\Theta_{AB}$. From Fig. 3 it is evident that $I_{C2}$, when reversed, becomes $-I_{C2}$ and leads $I_{C1}$ by an angle $\Theta_C$. In accordance with the invention, the circuitry shown in Figure 1 is constructed and arranged in such manner that $\Theta_{AB}$ plus $\Theta_C=90°$; thus $I_{25}$ and $-I_{C2}$ are in phase through heating resistor 25 under balanced load conditions, as shown in Figure 4. Accordingly a resultant current flows through heating resistor 25, which current is representative of the current flow from terminals A, B, and C of secondary winding 10. By calibrating scale in accordance with the voltage across secondary winding 10, and displacing an indicator across such scale in proportion to the resultant current flow through heating resistor 25, a unitary and economical volt-ampere demand meter for a polyphase system is provided. Mechanisms for effecting such indicator displacement responsive to passage of current are well known and understood in the art, and form no part of the present invention.

In Figure 4 the vectors are shown for a balanced load condition. However, because $\Theta_{AB}+\Theta_C$ is always equal to 90°, it is evident that regardless of the value of the angle $\phi$ between $I_{C1}$ and $I_{AB1}$, the angle between the two components ($I_{25}$ and $-I_{C2}$) of current in resistor 25 is $\phi-90°$. The angle $\phi$ will be 90°, and $I_{25}$ and $-I_{C2}$ will be in phase, only under conditions of balanced polyphase load as illustrated in Fig. 4. The total current in resistor 25 is represented by the vector sum $(I_{A1}-I_{B1}-j\sqrt{3}I_{C1})$, where $\sqrt{3}$ is a constant introduced by the proper turns ratio in the transformer 20, and it can be shown that when this current is multiplied by an assumed constant representing the balanced voltage of the system the result will be equal to $\sqrt{KW^2+KVAR^2}$; or which is also equal to the quantity of magnitude of $KW-jKVAR$, which by definition is KVA under conditions of balanced or unbalanced load.

To illustrate that the sum of $\Theta_{AB}$ plus $\Theta_C$ does in fact equal 90°, the voltage drops across variable resistor 23 and fixed resistor 25 effected by power coupled from three-wire current transformer 15 are first considered, disregarding the exciting current. It is apparent that the voltage which appears across resistor 23 also appears across the series circuit including resistor 25 and secondary winding 26; both circuits are connected between terminals 22 and 24. Accordingly, $$I_{23}R_{23}=I_{25}(R_{25}+jX_{26}) \quad (1)$$

Dividing both sides of Equation 1 by the ohmic value of $R_{23}$, $$I_{23}=I_{25}\left(\frac{R_{25}+jX_{26}}{R_{23}}\right) \quad (2)$$

or $$I_{23}=I_{25}\left(\frac{R_{25}}{R_{23}}+j\frac{X_{26}}{R_{23}}\right) \quad (3)$$

Considering the currents, it is evident that $$I_{AB2}=I_{25}+I_{23} \quad (4)$$

Substituting (3) for $I_{23}$ in (4), $$I_{AB2}=I_{25}+I_{25}\left(\frac{R_{25}}{R_{23}}+j\frac{X_{26}}{R_{23}}\right) \quad (5)$$

or $$I_{AB2}=I_{25}\left(1+\frac{R_{25}}{R_{23}}+j\frac{X_{26}}{R_{23}}\right) \quad (6)$$

and $$I_{AB2}=I_{25}\left(\frac{R_{23}+R_{25}}{R_{23}}+j\frac{X_{26}}{R_{23}}\right) \quad (7)$$

Considering the real and imaginary components of the quantity in parentheses in (7), $$\theta_{AB}=\arc-\tan\frac{X_{26}/R_{23}}{(R_{23}+R_{25})/R_{23}} \quad (8)$$

and $$\theta_{AB}=\arc-\tan\frac{X_{26}}{R_{23}+R_{25}} \quad (9)$$

With respect to transformer 20, neglecting the leakage reactance and losses, and referring to Fig. 3:

$$I_{M2}=\sqrt{(I_{C12})^2-(I_{C2})^2} \quad (10)$$

The voltage across the secondary winding 26 is equal to the sum of the drops across resistors 23 and 25, written as $$E_{C2}=I_{C2}(R_{23}+R_{25}) \quad (11)$$

The impedance $X_{26}$ of secondary winding 26 can be expressed as $$X_{26}=\frac{E_{C2}}{I_{M2}} \quad (12)$$

Substituting the value of $E_{C2}$ from (11) into (12), $$X_{26}=\frac{I_{C2}(R_{23}+R_{25})}{I_{M2}} \quad (13)$$

and $$\frac{X_{26}}{R_{23}+R_{25}}=\frac{I_{C2}}{I_{M2}} \quad (14)$$

Again referring to the vectors shown in Fig. 3, $$\theta_C=\arc-\cot\frac{I_{C2}}{I_{M2}} \quad (15)$$

and $$\theta_+=\arc-\cot\frac{X_{26}}{R_{23}+R_{25}} \quad (16)$$

$$\left(\arc-\tan\frac{X_{26}}{R_{23}+R_{25}}\right)+\left(\arc-\cot\frac{X_{26}}{R_{23}+R_{25}}\right)=90° \quad (17)$$

From identity (17) and from (9) and (16), $$\Theta_{AB}+\Theta_C=90° \quad (18)$$

Therefore it is apparent that $I_{25}$ and $-I_{C2}$ are in phase in resistor 25, when under balanced load conditions as shown in Fig. 4, and the invention does provide a single point for deriving an indication of the apparent power demand upon secondary winding 10.

Figure 5 shows a meter 30 which includes the inventive structure and additional equipment. The components shown in Fig. 1 are identified by identical reference numerals in Fig. 5. Additionally, a watthour meter consisting of electromagnetic elements such as 31 and 32 in Fig. 5 may be added to the inventive structure, in a manner well known and understood in the art. Accordingly meter 30 is effective to produce both an indication of volt-ampere demand of, and the watthours used by, the load circuit connected through meter 30 to the secondary winding 10 of a power transformer (not shown).

The invention is a compact and efficient structure for providing an indication of volt-ampere demand by a load in a polyphase power system. Such demand is indicated by deriving metering currents from the load currents, and providing suitable phase-shifting means to insure that at least a portion of all of the metering currents are in phase through a single element. The greater portion of such phase shift is effected by providing the air gap transformer 20, and the remainder of the shift is effected by a reactive circuit which includes the secondary winding 26 of such transformer 20. Thus the requisite phase relationship is established with a minimum of equipment. The components shown in the drawings are the only ones required. Prior art metering devices often require the addition of current transformers to the phase shifting means when large load currents are to be measured. In contradistinction to such known devices and methods, the inventive structure requires no additional equipment to meter large load currents; thus considerable equipment savings are realized by practice of the invention.

What is claimed is:

1. A measuring structure for measuring volt-ampere demand on a polyphase electrical power system having at least three phase conductors for coupling power to a load and having predetermined substantially equal and balanced phase voltages, said structure comprising: a first transformation means having a pair of primary windings coupled in opposite senses to two of said conductors for providing a first output signal indicative of current flow through said two conductors; a second transformation means coupled to the third of said conductors for providing a second output signal, differing in phase relation with said first output signal and indicative of current flow through the third of said conductors, including a magnetic core having an air gap for effecting a phase shift in said second output signal, said phase shift being in a predetermined direction to reduce the phase difference between said first and second output signals; heating means coupled to each of said first and second transformation means for energization by said first and second output signals; and means comprising circuit means and at least part of said second transformation means connected to said first transformation means and to said heating means for effecting an additional phase shift to further reduce said phase difference and for combining at least a portion of said first and second output signals in said heating means to provide an indication of the total current supplied to said load.

2. A meter of the class described for measuring volt-ampere demand on a polyphase electrical power system having phase conductors for coupling power to a load and operated at substantially equal and balanced phase voltages, said structure comprising: a 3-wire current transformer having a pair of primary windings coupled in opposite senses to first and second ones of said conductors, and a secondary winding coupled between a pair of reference terminals; a phase shifting transformer having a primary winding connected to a third one of said conductors and a secondary winding coupled to said primary winding by means including a magnetic core having an air gap; a first resistor coupled between said reference terminals; and a series circuit, comprising a second resistor and said secondary winding of said phase shifting transformer, coupled between said reference terminals, for providing a reference signal indicative alternatively of the apparent power and ampere demand of said load.

3. A volt-ampere demand meter for a polyphase electrical power system having voltages which are maintained substantially in balance and including three phase conductors for coupling power to a load, said demand meter comprising: a first metering transformer having a conventional primary winding connected to a first one of said conductors, a reversed primary winding connected to a second one of said conductors, and a secondary winding coupled between a pair of reference terminals for providing a first metering current indicative of the load current flow through said first and second conductors; a phase shifting and second metering transformer having a primary winding connected to the third one of said conductors and a secondary winding coupled with said primary winding by means including a magnetic core having an air gap for providing a second metering current different in phase from said first metering current and indicative of the load current flow through said third conductor, and for shifting the phase of said second metering current in a direction to reduce the phase difference between the first and second metering currents; a variable resistor coupled between said reference terminals; and a series circuit, comprising a fixed heating resistor and said secondary winding of said phase shifting transformer, coupled between said reference terminals, to further reduce said phase difference and provide a reference metering current indicative alternatively of the apparent power and ampere demand of said load.

4. In a volt-ampere demand meter of the class described for a polyphase electrical power system having at least three phase conductors for coupling power to a load, said polyphase system being operated with substantially equal and balanced phase voltages the combination of a first metering transformer having two primary windings connected in opposition to each other and to different phase conductors of said polyphase system and having a secondary winding coupled to said two primary windings, a second metering transformer having a primary winding connected to a third phase conductor of said polyphase system and having a secondary winding coupled to said latter primary winding, said second metering transformer comprising a magnetic core having an air gap for establishing a substantially in-phase relatonship between the metering current outputs of both of said secondary windings, and a heating element energized by the metering current of the secondary winding of said first metering transformer and by the metering current output of the secondary winding of said second metering transformer to provide an indication of the total current supplied to said load.

5. In a volt-ampere demand meter for a polyphase electrical power system having voltages which are maintained substantially in balance and including at least three phase conductors for coupling power to a load, the combination of: a first metering transformer having a first primary winding connected to a first one of said phase conductors, a reversed primary winding connected to a second one of said phase conductors, and a secondary winding responsive to said two primary windings, said secondary winding producing a first metering current output which is in phase with the vector difference of the primary currents referred to the secondary, said secondary winding being coupled between a pair of reference terminals; a second metering transformer having a primary winding connected to a third one of said phase conductors and having a secondary winding responsive to said latter primary winding to produce a second metering current output, said second metering transformer comprising a magnetic core having an air gap therein, said air gap magnetic core functioning as phase shifting means for establishing a substantially in-phase relationship between the meterng current outputs of said two secondary windings; a variable resistor connected in shunt across said reference terminals; a heating resistor; and a series circuit connecting the secondary winding of said second metering transformer and said heating resistor together in series between said reference terminals, whereby said heating resistor is energized by the metering current outputs of said two secondary windings to provide an indication of the total current supplied to said load.

References Cited in the file of this patent

UNITED STATES PATENTS

| | | |
|---|---|---|
| 1,609,141 | Thompson | Nov. 30, 1926 |
| 1,816,675 | Grassot | July 28, 1931 |
| 1,816,676 | Grassot | July 28, 1931 |
| 1,854,490 | Sola | Apr. 19, 1932 |
| 2,513,890 | Petzinger | July 4, 1950 |